United States Patent [19]

Graham et al.

[11] 4,232,224
[45] Nov. 4, 1980

[54] NUCLEAR REACTOR PRIMARY COOLANT LOOP FLOWMETER WITH PHASE SHIFT TRACKING COMPENSATION

[75] Inventors: Kingsley F. Graham, Murrysville; Raj Gopal, Churchill, both of Pa.

[73] Assignee: Westinghouse Electric Corp., Pittsburgh, Pa.

[21] Appl. No.: 946,463

[22] Filed: Sep. 28, 1978

[51] Int. Cl.² ............................................. G01F 1/00
[52] U.S. Cl. ..................................... 250/356; 250/435
[58] Field of Search ........... 250/356, 390, 392, 432 R, 250/435; 73/194 E; 176/19 R; 364/504, 556

[56] References Cited

U.S. PATENT DOCUMENTS

| Re. 28,686 | 1/1976 | Coulthard | 73/194 E |
|---|---|---|---|
| 3,818,231 | 6/1974 | Gopal et al. | 250/356 |

*Primary Examiner*—Davis L. Willis

*Attorney, Agent, or Firm*—Daniel C. Abeles; Z. L. Dermer

[57] ABSTRACT

An improved nuclear reactor primary loop flowmeter having two spaced N-16 detectors (12 and 14) positioned along the primary loop piping for monitoring the N-16 activity within the coolant at the respective detector locations. The outputs of the two detectors are cross-correlated to determine the transit time of corresponding N-16 perturbations viewed at the two detector locations. The improvement comprises means for switching (34 and 36) the respective detector output electronic processing channels (18 and 20) between detectors (12 and 14) and measuring the maximum cross-correlation function (30 and 32) with the detector output channels in their original and switched positions to determine the true coolant transit time between detector locations and any phase shift induced by the detector output channels.

8 Claims, 1 Drawing Figure

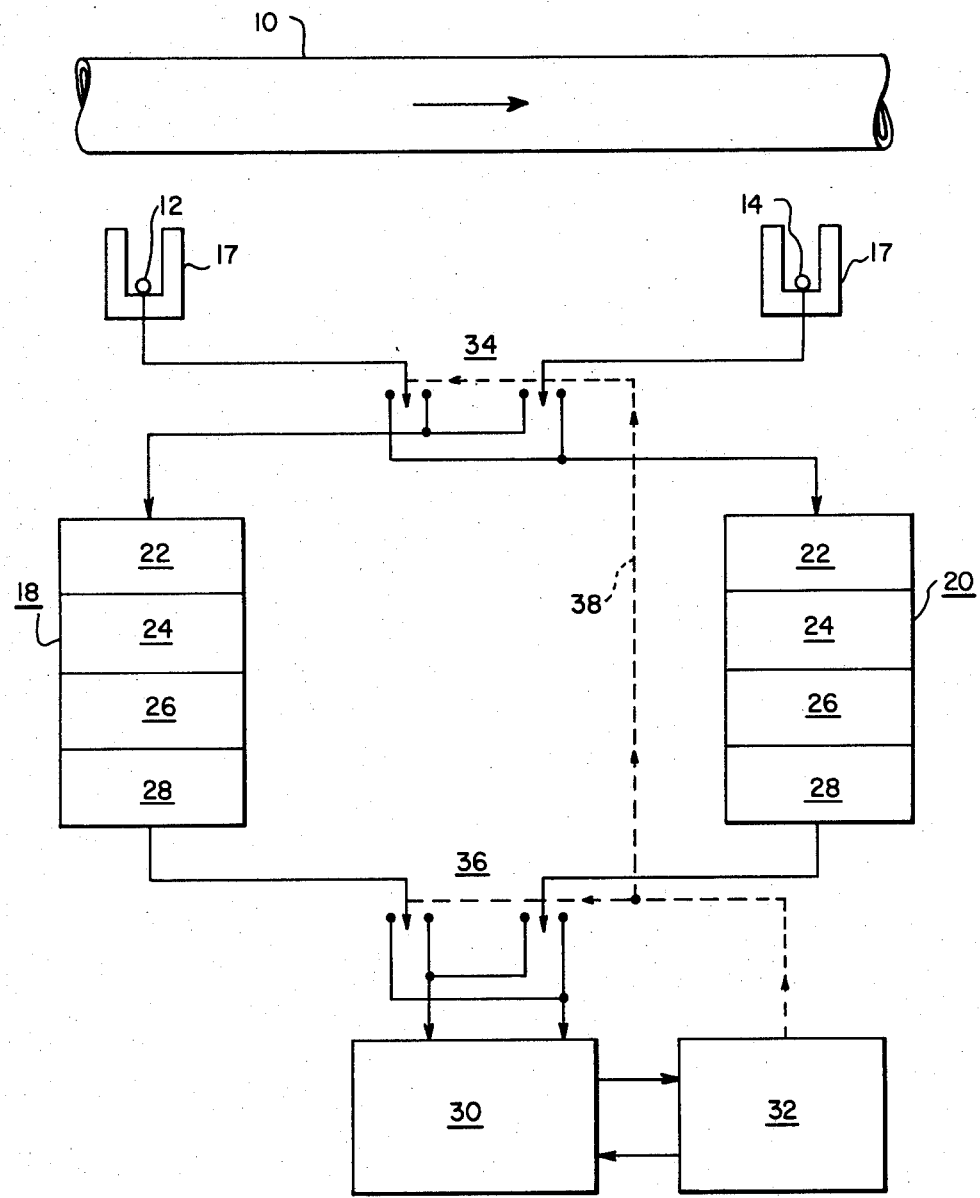

NUCLEAR REACTOR PRIMARY COOLANT LOOP FLOWMETER WITH PHASE SHIFT TRACKING COMPENSATION

CROSS-REFERENCE TO RELATED APPLICATIONS

This invention is an improvement to the flowmeter described in U.S. Pat. No. 3,818,231 issued June 18, 1974 and assigned to the Westinghouse Electric Corporation, Pittsburgh, Pa.

BACKGROUND OF THE INVENTION

This invention pertains generally to a system for measuring the rate of flow of coolant within a nuclear reactor coolant loop and more particularly to such a system which utilizes the statistical variation of the N-16 activity within the coolant to obtain the flow rate measurement.

The N-16 transit time flowmeter of U.S. Pat. No. 3,818,231 utilizes the cross-correlation of the output signals generated from two N-16 gamma detectors positioned at spaced locations along a reactor coolant pipe to determine the transit time of corresponding N-16 perturbations traversing the pipe between detector locations; and thus establishes the corresponding coolant flow rate. In order that systematic errors are not introduced by the electronics, which process each of the detector outputs, the electronics channels for each detector must be extremely and accurately matched. Each detector channel generally includes a picoammeter front end to convert the very low detector current signal of approximately $3 \times 10^{-8}$ amperes to voltage signals, high and low pass filters to reject the DC component and high frequency components, and an analog-to-digital converter to digitize the signals which are then cross-correlated in a digital cross-correlator. The degree of matching required to avoid phase shift errors in the cross-correlation function is difficult to obtain and maintain in a plant environment. Without obtaining this degree of matching, any phase shift present is likely to add an error to the measured transit time between N-16 detectors.

Accordingly, a new system is desired that will eliminate systematic errors due to imperfect phase shift matching between the two analog input channels. Preferably, such a system should identify any excessive drift in the electronics and avoid the necessity for on-line calibrations. If the source of error is eliminated, the degree of matching required for the electronics could be significantly reduced, reducing the cost of the electronics, while increasing the accuracy and reliability of the overall system.

SUMMARY OF THE INVENTION

This invention overcomes the noted deficiencies of the prior art by providing a means for switching (34 and 36) the respective detector channels (18 and 20) between detectors (12 and 14) and comparing (32) the separate cross-correlator (30) outputs obtained with the channels (18 and 20) connected in their normal and switched positions to identify the true transit flow time of coolant within the coolant loop as well as any phase shift introduced by either of the detector channels (18 and 20).

BRIEF DESCRIPTION OF THE DRAWING

For a better understanding of the invention, reference may be had to the preferred embodiment, exemplary of the invention, shown in the accompanying drawing which includes a schematic block illustration of the improved flowmeter of this invention.

DESCRIPTION OF THE PREFERRED EMBODIMENT

This invention provides an improvement to the flowmeter described in U.S. Pat. No. 3,818,231, which utilizes the statistical variation of the Nitrogen-16 activity in the reactor coolant for making flow rate determinations. The flow is calculated based upon knowing the distance between two Nitrogen-16 detectors spaced along the reactor coolant loop and determining the time which elapses for an N-16 activity pattern to travel from the first detector to the second detector positioned downstream.

Nitrogen-16 is a gamma emitting isotope with a 7.35 second half-life. The gamma activity is induced from Oxygen-16 within the reactor coolant by the bombardment of fast neutrons. This N-16 gamma activity is the principle radiation emitted from the primary coolant of a pressurized water reactor.

Referring now to the drawing, it will be appreciated that the FIGURE includes a partial section of a reactor coolant loop 10 having two gamma detectors 12 and 14 positioned at spaced locations along the flow path of the coolant. The U-shaped shielding 17 surrounding the detectors 12 and 14 act as collimators to limit the exposure of the detectors to a small area of the coolant piping abutting the opening of the collimators. The outputs of the detectors 12 and 14 are processed through separate channels 18 and 20, which includes picoammeters 22, high-pass filters 24, low-pass filters 26, and analog-to-digital converters 28 to condition the detector outputs for presentation to a digital cross-correlator 30 for processing. The cross-correlator receives inputs from both channels 18 and 20 and delays the input corresponding to detector 12 with respect to that of detector 14 until corresponding points on the two detector signals are matched; the delay being representative of the transit time of the N-16 activity between detectors. One method of establishing the delay, as explained in the aforecited patent, is to sum the two detector outputs and delay the first with respect to the second until the sum is maximized. The transit time thus identified is stored in the microprocessor 32, which can be programmed to calculate the flow rate from the measured delay and the known distance between detectors.

However, unless the electronics in both channels 18 and 20 are perfectly matched, a phase shift error will be included in the delay time identified by the cross-correlator, as a result of the mismatch in signal transit time through the two channels. To avoid the necessity of matching the electronics with the precision that would otherwise be required to avoid this error, which is costly, and the need for recalibration to assure that the electronics does not drift unpredictably, this invention provides means 34 and 36 for switching the respective detectors between channels yet maintaining the separate detector outputs coupled to their corresponding inputs to the correlator unit 30. Note that switching means 34 and 36 are coupled through a mechanical or electrical connection 38 so that when detector 12 is reconnected from channel 18 to channel 20, the operative channel 20 is reconnected at the same time to the appropriate input of the cross-correlator which corresponded originally to detector 12. Similarly, and at the same time, detector 14 will be reconnected to channel 18 and the corresponding input of the cross-correlator. In addition, the microprocessor program is adjusted so that it stores the cross-correlation information generated with the detectors connected in their normal and switched positions so that two separate transit times are recorded. The separate transit times are employed, as explained hereafter, to determine the true transit time and any phase shift error introduced by the electronics.

For example, a measurement of the transit time is performed with channel 18 being used to process the signal from the upstream detector and channel 20 used to process the signal from the downstream detector 14. The measured transit time is then:

$$T_{Normal} = T_{True} + \text{Phase Shift Error}$$

where:

$T_{Normal}$ is the measured transit time in the normal mode with channel 18 being used for the detector 12 and channel 20 being used for detector 14.

$T_{True}$ is the true transit time.

Phase Shift Error is the transit time error due to phase shift unmatching within the electronics of the two channels.

The transit time is then measured with the analog channels 18 and 20 switched; channel 20 is used for the upstream detector signals 12 and channel 18 is used for the downstream detector signals 14. The measured transit time is:

$$T_{Reverse} = T_{True} - \text{Phase Shift Error}$$

where:

$T_{Reverse}$ is the measured transit time with channel 20 being used for the detector 12 and channel 18 being used for the downstream detector signal.

Because of the channel reversal, the sign of the phase shift error has reversed. The magnitude of the phase shift error will not change unless the components have drifted in value between the two measurements. However, because of the closeness in time of the two measurements this is highly unlikely. The true transit time, $T_{True}$, will not change unless the actual flow has changed between the two measurements.

The true transit time needed to calculate the reactor coolant flow rate is then:

$$T_{True} = (T_{Normal} + T_{Reverse})/2$$

The phase shift error can also be obtained from the two measurements:

$$\text{Phase Shift Error} = (T_{Normal} - T_{Reverse})/2$$

A measurement of phase shift error can be used to determine whether the matching between the two channels has become so poor that an electronics failure can be suspected. Also by making a series of measurements, the time stability of the phase shift error can be demonstrated. This is easily indicated by programming the microprocessor to identify a phase shift error above a preestablished value and to provide a readout of the phase shift error at preselected time intervals.

Microprocessors for implementing these functions are readily available in the art and the means for programming the rudimentary functions required of the microprocessors are well known in the art. The switching between detector channels can be performed automatically under control of the microprocessors as part of the steps employed in gathering and storing the data from the cross-correlator.

Thus, the program of the microprocessor selects the normal mode of operation and performs a transit time measurement with the cross-correlator establishing $T_{Normal}$. Reversal of analog electronics is then made and the reverse mode transit time, $T_{Reverse}$ is measured. The microprocessor then calculates the phase shift error and the true transit time as explained above. If the phase shift error is greater than a preselected value, the microprocessor flags an error condition.

Thus, the improvement of this invention further increases the accuracy and reliability of the N-16 flowmeter previously described in U.S. Pat. No. 3,818,231.

We claim as our invention:

1. An improved nuclear reactor primary coolant loop flowmeter having a first detector positioned substantially adjacent to the coolant loop at a first location, which is responsive to the gamma radiation emanating from the Nitrogen-16 activity within the reactor coolant at the first location to provide a representative electrical output, a first detector channel for conditioning and communicating the first detector's output, a second detector positioned substantially adjacent to the coolant loop at a second location downstream of the first location, which is responsive to the gamma radiation emanating from the Nitrogen-16 activity within the reactor coolant at the second location to provide a representative electrical output, a second detector channel for conditioning and communicating the second detector's output, and means having inputs from the first and second detector channels' outputs for cross-correlating the first and second detectors' outputs and delaying the first output with respect to the second until the cross-correlation function approaches a maximum so as to determine the delay time between corresponding points in the first and second outputs, wherein the improvement comprises means for switching the first detector output to the second detector channel and the second detector output to the first detector channel and means for adding the delay times monitored between corresponding points in the first and second outputs by the cross-correlating means with the first and second detectors connected in both switching positions to provide an output proportional to the primary coolant flow rate.

2. The improved nuclear reactor primary coolant flowmeter of claim 1 including means for dividing the output of the adding means which is proportional to the primary coolant flow rate, by two to provide the primary coolant transit time between the first and second locations.

3. The improved nuclear reactor primary coolant flowmeter of claim 1 wherein the switching means maintains the first and second detectors' outputs connected to the corresponding inputs of the cross-correlating means irrespective of the detector to channel connection of the switching means.

4. The improved nuclear reactor primary coolant flowmeter of claim 1 including means for subtracting the delay times monitored between corresponding points in the first and second outputs by the cross-correlating means with the first and second detectors connected in both switching positions to provide an output proportional to the phase shift error between the outputs of the first and second detector channels.

5. The improved nuclear reactor primary coolant flowmeter of claim 4 including means for identifying when the phase shift error exceeds a preselected value.

6. An improved nuclear reactor primary coolant loop flowmeter having a first detector positioned substantially adjacent to the coolant loop at a first location, which is responsive to the gamma radiation emanating from the Nitrogen-16 activity within the reactor coolant at the first location to provide a representative electrical output, a first detector channel for conditioning and communicating the first detector's output, a second detector positioned substantially adjacent to the coolant loop at a second location downstream of the first location, which is responsive to the gamma radiation emanating from the Nitrogen-16 activity within the reactor coolant at the second location to provide a representative electrical output, a second detector channel for conditioning and communicating the second detector's output, and means having inputs from the first and second detector channels' outputs for cross-correlating the first and second detectors' outputs and delaying the first output with respect to the second until the cross-correlation function approaches a maximum so as to determine the delay time between corresponding points in the first and second outputs, wherein the improvement comprises means for switching the first detector output to the second detector channel and the second detector output to the first detector channel and means for subtracting the delay times monitored between corresponding points in the first and second outputs by the cross-correlating means with the first and second detectors connected in both switching positions to provide an output proportional to the phase shift error between the outputs of the first and second detector channels.

7. The improved nuclear reactor primary coolant flowmeter of claim 6 wherein the switching means maintains the first and second detectors' outputs connected to the corresponding inputs of the cross-correlating means irrespective of the detector to channel connection of the switching means.

8. The improved nuclear reactor primary coolant flowmeter of claim 7 including means for identifying when the phase shift error exceeds a preselected value.

* * * * *